United States Patent [19]

Carr

[11] 4,454,967
[45] Jun. 19, 1984

[54] DRIP PREVENTER

[76] Inventor: Michael A. Carr, 685 - 4th Ave. S., Carrington, N. Dak. 58421

[21] Appl. No.: 369,661

[22] Filed: Apr. 19, 1982

[51] Int. Cl.³ .............................................. B65D 37/00
[52] U.S. Cl. ................................... 222/213; 222/494; 222/545
[58] Field of Search ............... 222/212, 213, 490, 491, 222/494, 571, 108, 511, 512, 206, 215, 545

[56] References Cited

U.S. PATENT DOCUMENTS

| | | | |
|---|---|---|---|
| 1,045,404 | 11/1912 | Hottenroth . | |
| 1,281,974 | 10/1918 | Kaeding . | |
| 2,064,695 | 12/1936 | Sipe | 152/12 |
| 2,197,052 | 4/1940 | Lowen | 15/135 |
| 2,513,272 | 7/1950 | Bowen | 222/490 |
| 2,576,192 | 11/1951 | Poznik | 220/86 |
| 2,594,318 | 4/1952 | Langdon | 137/69 |
| 2,605,026 | 7/1952 | Wagner | 222/490 |
| 2,644,633 | 7/1953 | Klingler | 251/122 |
| 2,687,707 | 8/1954 | O'Shei | 121/142 |
| 2,753,091 | 7/1956 | Herzig | 222/491 |
| 2,973,230 | 2/1961 | Eastburg | 308/187 |
| 3,060,882 | 10/1962 | Peters et al. | 114/185 |
| 3,107,035 | 10/1963 | Cholet | 222/213 |
| 3,125,114 | 3/1964 | Langdon | 137/218 |
| 3,129,894 | 4/1964 | Schermerhorn | 239/602 |
| 3,199,787 | 8/1965 | Oishei et al. | 239/284 |
| 3,216,575 | 11/1965 | Stuart | 210/280 |
| 3,241,726 | 3/1966 | Chester | 222/211 |
| 3,269,664 | 8/1966 | Lamb et al. | 239/272 |
| 3,339,809 | 9/1967 | Church | 222/215 |
| 3,349,972 | 10/1967 | Whiteford | 222/212 |
| 3,445,042 | 5/1969 | Elmore et al. | 222/212 |
| 3,485,419 | 12/1969 | Taylor | 222/340 |
| 3,618,825 | 11/1971 | Clarke | 222/494 X |
| 3,621,876 | 11/1971 | Campbell | 137/525.1 |
| 3,674,183 | 7/1972 | Venable et al. | 222/212 |
| 3,788,544 | 1/1974 | Koskinen | 239/11 |
| 3,923,210 | 12/1975 | Jackson | 222/494 |
| 3,995,780 | 12/1976 | Showalter | 222/494 |
| 4,067,414 | 1/1978 | Funke | 184/105 |

Primary Examiner—Joseph J. Rolla
Assistant Examiner—Michael S. Huppert
Attorney, Agent, or Firm—Kinney & Lange

[57] ABSTRACT

A drip retainer for preventing residual fluid in a spout from dripping includes a tubular resilient member which is flattened at one end so that opposite walls are biased together. An opposite end of the tubular member is connected in a liquid-tight manner to the spout. A cylindrical clamp is mounted on the flattened portion of the tubular member. A hollow area inside the cylindrical clamp is filled with resilient biasing material. The biasing material, on either side of the flattened portion, urges the tubular member to a flat closed position. When liquid is pumped through the spout under pressure, the liquid urges the flattened portion of the tubular member to an open position. When pressure subsides, the biasing material urges the flattened portion back to its closed position, so that residual fluid clinging to inside walls of the spout cannot escape.

9 Claims, 5 Drawing Figures

U.S. Patent Jun. 19, 1984 4,454,967
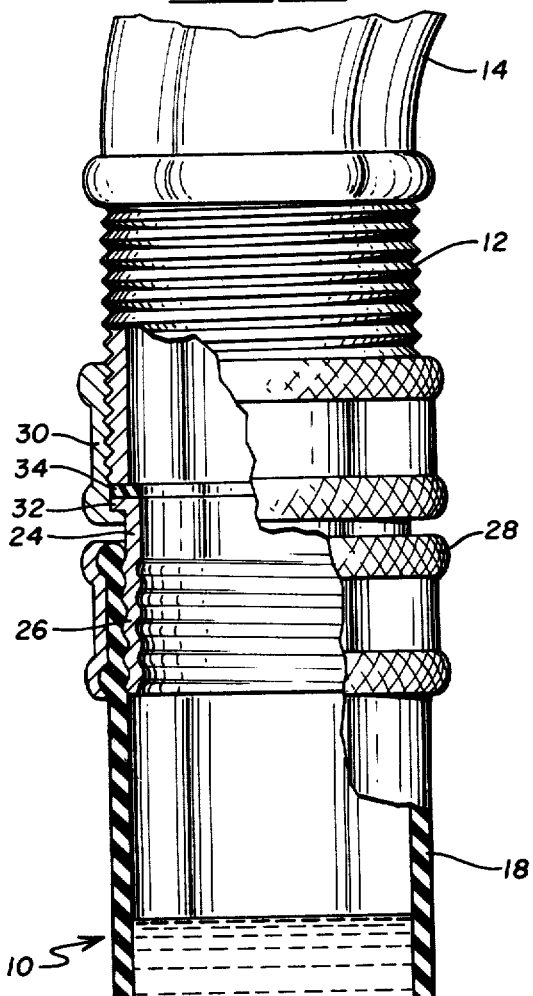
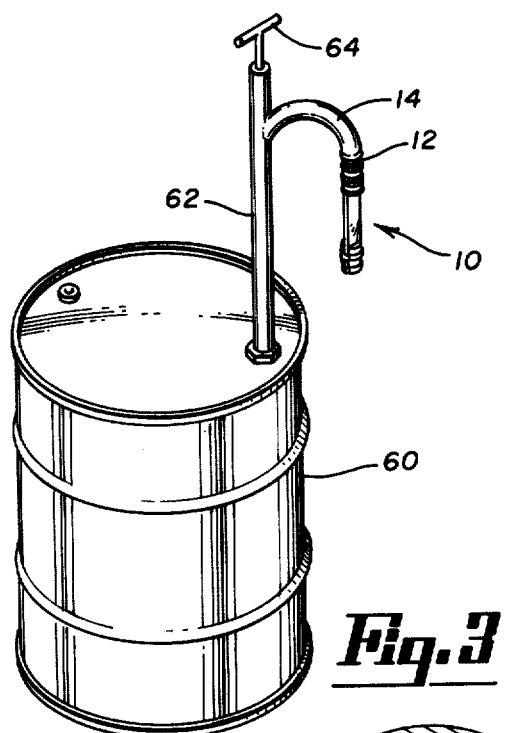
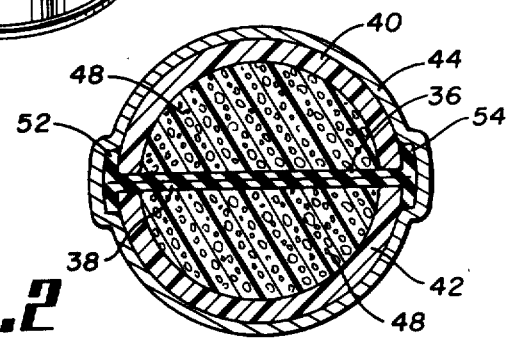
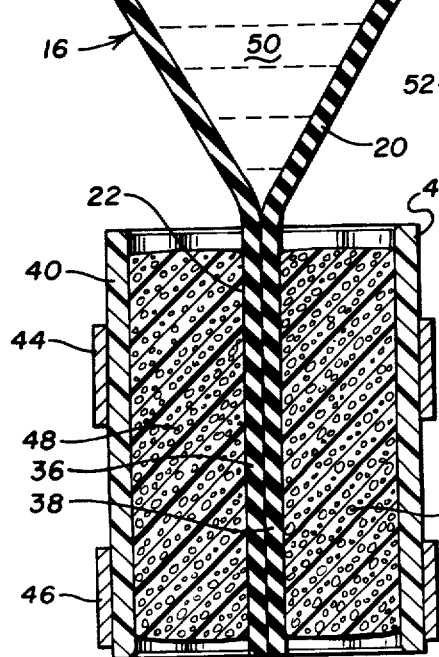
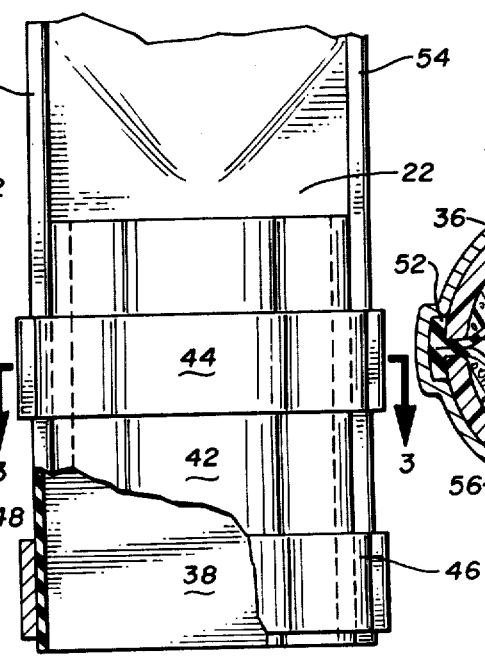
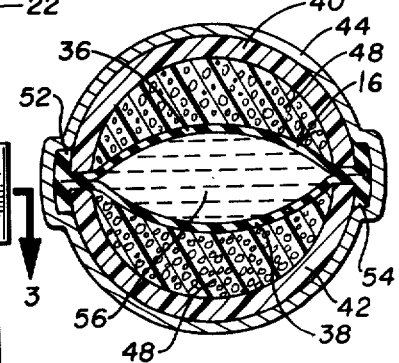

DRIP PREVENTER

BACKGROUND OF THE INVENTION

1. Field of the Invention

This invention relates to apparatus for preventing residual liquid from dripping from a spout.

2. Description of the Prior Art

There has long been the need for a device to prevent residual liquid, which clings to the inner walls of a spout, from dripping out of the spout. In particular, spouts used for dispensing high viscosity liquids may drip liquid for a long time after the major flow has ended. An example of this is a drum of oil in a mechanical shop. A hand pump is commonly used to draw oil from a drum. It is then dispensed through a downward-directed spout. After the proper amount of oil is dispensed, the container in which it is collected is withdrawn for carrying the oil to its intended destination. Residual oil clings to the inner wall of the spout and slowly drips on the floor. The oil spot on the floor is not only an unsightly dirt collector, but it creates an unsafe slippery spot. Moreover, a substantial amount of oil is wasted in this manner.

Some have tried to catch this residual dripping oil in a pan on the floor. The result is that the pan becomes the unsightly dirt collector. Oil captured in this manner is not clean enough for use and must be disposed of. In addition, the pan must sit exactly where it is most likely to be kicked over by the feet of those dispensing oil. What is needed is a device which will allow the pumping of oil through the spout, but which will retain residual oil until the next pumping occurs. No prior art device has been found which retains this residual oil within the spout.

U.S. Pat. No. 3,923,210 to Jackson, issued Dec. 2, 1975, shows a discharge regulator for use in a hydrocyclone. A pair of flexible sheets extends from the outlet on the hydroclone to allow passage of slurry, but to prevent the passage of liquid which contains no solid matter. The device is designed to allow passage of sand or other granular particles, but not liquid.

U.S. Pat. No. 3,995,780 to Showalter, issued Dec. 7, 1976, discloses a mechanism for discharging a slurry which has a valve actuated by a lever arrangement. The pressure needed to discharge slurry through the valve is dependent upon the weight acting upon the lever.

U.S. Pat. No. 3,129,894 to Schermerhorn, issued Apr. 21, 1964, discloses a nozzle guard for faucet spouts. The purpose of this guard is to provide a resilient surface so that dishes or glassware striking the nozzle will not break. One embodiment has a narrowing orifice which restricts the amount of flow.

U.S. Pat. No. 3,216,575 to Stuart, issued Nov. 9, 1965, discloses a check valve having a rubber sleeve which allows the flow of water into the sand bed of a filter apparatus, but which prevents backward flow.

U.S. Pat. No. 3,788,544 to Koskinenm, issued Jan. 19, 1974, discloses an agricultural irrigation system in which a check valve is employed to allow passage of water in one direction but to restrain somewhat its passage in the opposite direction. An elastometric cone-shaped section is slit to form opposed lips to allow the passage of water in one direction.

U.S. Pat. No. 3,269,664 to Lamb et al, issued Aug. 30, 1966, discloses a nozzle for discharging air into a liquid, such as in a bubbler used to prevent water from freezing. The valve has resilient lips which vibrate to form bubbles of air in the water. Air is discharged through the valve.

U.S. Pat. No. 3,199,787 to Oishei, issued Aug. 10, 1965, discloses a windshield washer system which has an elastometric nozzle. The nozzle is substantially tubular with a closed end having a transverse slit. The slit is designed to vibrate and break up the liquid into fine particles.

U.S. Pat. No. 3,107,035 to Cholet, issued Oct. 15, 1963, involves a squeeze cap for dispensing liquids from a container. A spherical valve sits in a valve seat to close a nozzle when it is not being squeezed.

U.S. Pat. No. 2,197,052 to Lowen, issued Apr. 16, 1940, discloses an applicator for fluid or viscous substance which includes a resilient rubber closure with a slit. Squeezing the tube opens the slit to allow the passage of liquid through the rubber cap.

U.S. Pat. No. 2,064,695 to Sipe, issued Dec. 15, 1936, discloses an air valve which includes a stem portion of soft rubber, with a slit. Air under pressure escapes through the slit, which seals to prevent backward flow.

Another air check valve is disclosed in U.S. Pat. No. 1,281,974 to Kaeding, issued Oct. 15, 1918, in which a pair of opposed flat jaws squeeze together an elastic tube. An elastic band aids in squeezing together the jaws so that the valve releases air under pressure but does not allow any backward flow.

U.S. Pat. No. 2,594,318 to Langdon, issued Apr. 29, 1952, discloses a check valve for preventing of backflow by using a check valve member made of flexible material with a slit.

U.S. Pat. No. 1,045,404 to Hottenroth, issued Nov. 26, 1912, discloses an air-tight check valve in which a tube has an opening which allows flow of air in one direction, but prevents back flow.

U.S. Pat. No. 3,060,882 to Peters et al, issued Oct. 30, 1962, shows a boat drain having a tubular elastomeric valve body with a flattened portion which allows the flow of liquid in one direction, but which is closed by the pressure of liquid in the opposite direction.

U.S. Pat. No. 2,513,272 to Bowen, issued July 4, 1950, discloses a dispensing valve for pressurized material which has a rubber valve member with transverse slits. The slits are opened by downward pressure on the spout.

U.S. Pat. No. 2,605,026 to Wagner, issued July 29, 1952, involves a cap for dispensing paste from a collapsible tube. The cap has a rubber compressible body with a slit which opens to allow dispensing of paste under pressure.

U.S. Pat. No. 2,576,192 to Poznik, issued Nov. 27, 1951, involves a venting attachment for gasoline tank filling necks. A check valve has flaps which are spread apart by the nozzle from which gasoline is dispensed. When the nozzle is removed, the flaps close to prevent escape of gasoline as a result of trapped air or frothing of the gasoline.

No prior art shows a device for preventing drips from a spout. What is needed is an apparatus which can satisfactorily allow the passage of liquid under pressure and yet retain liquid which is only under the pressure of gravity. A device must be economical and easily attachable to any downward pointing spout.

Applicant previously developed a drip retainer employing a tubular element of resilient material with a flattened portion made by biasing opposite walls of the tubular element together. This was the subject of U.S.

patent application Ser. No. 781,188, filed Mar. 25, 1977, now abandoned. It was found that the tubular element did not maintain its flat state sufficiently to retain liquid.

SUMMARY OF THE INVENTION

The present invention involves a drip retainer which is attached to the end of the spout for preventing residual liquid from dripping from the spout when the liquid is not under pressure.

A drip retainer constructed according to the present invention has a tubular member of resilient, preferably elastomeric, material and means to connect the tubular member to the spout in liquid-tight manner. An end of the tubular element away from the spout is flattened so that opposite walls of the tubular member are biased together.

A generally hollow, preferably cylindrical, clamp means is mounted on the flattened portion of the tubular member. Resilient biasing material is fitted within the cylindrical clamp means on either side of the flat portion of the tubular member, so that biasing material urges the tubular member to a flat closed position.

When liquid is moved to the spout under pressure, the liquid pressure urges the flattened portion of the tubular member to an open position. When the pressure is decreased to normal gravitational pressure, the biasing material urges the flattened portion back into its closed position.

In the preferred embodiment, a drip retainer designed for use with oil includes a tubular element constructed of oil-resistant material such as Butyl N rubber.

BRIEF DESCRIPTION OF THE DRAWINGS

FIG. 1 is a side elevational view, partially in section, showing a drip retainer constructed according to the present invention attached to a spout;

FIG. 2 is a front fragmentary elevational view of the lower portion of the drip retainer of FIG. 1, the view being taken at 90° with respect to FIG. 1;

FIG. 3 is a cross sectional view taken on line 3—3 of FIG. 2, showing the tubular member in a closed position;

FIG. 4 is a cross sectional view taken on line 3—3 of FIG. 2 with the tubular member in an open position for the passage of liquid; and FIG. 5 is a perspective view of an oil drum, an outlet pipe, a hand pump, and a spout with an attached drip retaining device constructed according to the present invention.

DETAILED DESCRIPTION OF THE PREFERRED EMBODIMENTS

A drip retainer 10 constructed according to the present invention is shown in FIG. 1 attached to the threaded spout 12 of an outlet pipe 14, through which liquid is intermittently pumped under pressure. Drip retainer 10 includes a resilient tubular member 16 which has an upper cylindrical portion 18, a tapering portion 20, and a lower flattened portion 22. Tubular member 16 is made of elastomeric material such as rubber or neoprene. A tubular member is preferably made of Butyl N rubber because of its oil-resistant properties.

In the embodiment illustrated, the means for attaching tubular member 16 to threaded spout 12 involves a conventional thimble-and-nipple arrangement. A nipple 24 has a corrugated portion 26. The upper end of the cylindrical portion 18 of resilient tubular member 16 is slipped over corrugated portion 26. A ring 28 is then rolled over tubular member 16 to secure it to corrugated portion 26. A cylindrical thimble 30 fits over a collar 32 on nipple 18. Thimble 30 is internally threaded so as to enable the thimble to be threadably attached to spout 12. A gasket 34 is placed between collar 32 and spout 12 to ensure a liquid-tight connection.

The tubular member 16 is formed so that the lower opposite walls 36 and 38 are flat and firmly engage each other. This may be accomplished by molding the tubular member 16 so that the flat wall portions are biased together. Unfortunately, it is very difficult to insure that each flat portion, after being used a while, will continue to engage each other firmly enough to prevent liquid from escaping. To overcome this problem, means are provided for further biasing the flat portions 36 and 38 together. Clamp elements which, in the embodiment illustrated are cylinder halves 40 and 42, are clamped against opposite walls 36 and 38, respectively, by bands 44 and 46. The area inside the cylinder halves 40 and 42 is filled with resilient material 48, such as plastic foam. The resilient material 48, in the example illustrated, is a cylinder of closed-cell foam sliced longitudinally. Material 48 is slipped between wall 36 and cylinder half 40 and between wall 38 and cylinder half 42. Material 48 is frictionally held in place within the cylinder halves 40 and 42. The resilient material 48 assists in biasing together walls 36 and 38. Residual liquid 50 is shown trapped inside tubular element 16 by the biasing action of walls 36 and 38 and the resilient material 48.

In the example illustrated, tubular member 16 includes a pair of longitudinal ridges 52 and 54, against which are clamped the cylinder halves 40 and 42. The ridges 52 and 54 prevent the flattened portion 22 from transversely slipping out of position relative to cylinder halves 40 and 42.

The cross sectional views of FIGS. 3 and 4 show the drip retainer in a closed and an open position, respectively. FIG. 3 shows opposite walls 36 and 38 biased together, as in the view of FIG. 1. FIG. 4 shows the configuration of walls 36 and 38 when liquid under pressure 56 passes through tubular member 16. When pressure is applied to liquid 56, walls 36 and 38 are forced apart, which squeezes together resilient material 48. Once pressure returns to normal gravitational pressure, resilient material 48 biases resilient walls 36 and 38 back to the position of FIG. 3. Therefore, residual liquid under gravitational pressure will be held within drip retainer 10. When pressure is applied, liquid will pass through drip retainer 10.

FIG. 5 shows an oil drum 60 with an upstanding pipe 62 which constitutes part of a pump, mounted through its top. A pump handle 64 activates the pump to draw oil out of drum 60 up through pipe 62 and out through an outlet pipe 14. The drip retainer 10 is shown connected to spout 12 of outlet pipe 14.

In operation, handle 64 is moved vertically to pump oil through upstanding pipe 62 out through outlet pipe 14. The oil under pressure forces apart walls 36 and 38 as shown in FIG. 4. The pumped oil is then dispensed into a waiting container. When the pumping stops, some residual oil remains in outlet pipe 14. The high viscosity of oil causes it to cling to the inner walls of the outlet pipe 14. The pressure is reduced when pumping stops so that the drip retainer returns to the position of FIG. 3 preventing the escape of liquid. The residual oil slowly flows down the inner walls of pipe 14 and collects within the drip retainer 10 as shown in FIG. 1. This residual oil which was formerly wasted and which created an unsightly mess, is now retained for use as part of the next pumping of oil.

Although the present invention has been described with reference to a preferred embodiment, workers skilled in the art will recognize that changes may be made in form and detail without departing from the spirit and scope of the invention.

What is claimed is:

1. A drip retainer, for attachment to a downwardly extending spout through which liquid intermittently passes under pressure, for retaining liquid not under pressure, the drip retainer comprising:

a resilient tubular member of a size of retain liquid dripping from the spout, the tubular member being flattened at its lower end wherein opposite lower walls of the tubular member are biased together;

means to connect the upper end of the tubular member to the spout in a liquid-tight manner;

hollow clamp means mounted on the lower end of the tubular member in generally surrounding relation to the flattened portion of the tubular member; and resilient biasing material within the clamp means on both sides of the flat portion biasing the walls of the tubular element together in such a manner that the biasing material urges the flattened portion to a closed position in which residual liquid in the spout is prevented from passing through the flattened portion, and wherein the biasing material allows passage through the tubular member of liquid under pressure greater than that resulting from residual liquid in the tubular member.

2. The apparatus of claim 1 wherein the clamp means includes:

a pair of generally symmetric clamp elements, each clamp element being positioned against one side of the flattened portion of the tubular member to form a hollow area for expansion of the tubular member; and a band surrounding the clamp elements for tightly engaging the clamp elements against the flattened portion.

3. The apparatus of claim 2 wherein the clamp elements are cylinder halves and the band is generally circular.

4. The apparatus of claim 2 wherein the tubular element has a pair of opposed raised ridges extending along opposite sides of the tubular element and forming opposite edges of the flattened portion, outside of the clamp elements, the ridges preventing the tubular element from transverse movement relative to the clamp elements.

5. The apparatus of claim 4 wherein the clamp elements engage the flattened portion within the ridges.

6. The apparatus of claim 1 wherein the biasing material is resilient plastic foam.

7. The apparatus of claim 1 wherein the resilient tubular member is made of neoprene.

8. A drip-retaining pump apparatus comprising:

a reservoir of liquid;

a pump for pumping liquid out of the reservoir;

a spout extending downwardly from the pump for discharging liquid;

a drip retainer including: a resilient tubular member of a size to retain liquid dripping from the spout, the tubular member being flattened at its lower end wherein opposite lower walls of the tubular member are biased together;

means connecting the upper end of the tubular member to the spout in a liquid-tight manner;

hollow clamp means mounted on the lower end of the tubular element in generally surrounding relation to the flattened portion of the tubular element; and resilient biasing material within the clamp means on both sides of the flattened portion biasing the walls of the tubular element together.

9. The apparatus of claim 8 wherein the pump is a hand-operated pump.

* * * * *